(12) United States Patent
Ouellette et al.

(10) Patent No.: US 10,317,905 B2
(45) Date of Patent: Jun. 11, 2019

(54) AUTONOMOUS ROBOTIC TECHNOLOGIES FOR INDUSTRIAL INSPECTION

(71) Applicant: RavenOPS, Inc., San Francisco, CA (US)

(72) Inventors: Joshua Ouellette, San Francisco, CA (US); Charles Post, San Francisco, CA (US); Randall Shults, San Francisco, CA (US); Thomas Stone, San Francisco, CA (US)

(73) Assignee: RavenOPS, Inc., San Francisco, CA (US)

( * ) Notice: Subject to any disclaimer, the term of this patent is extended or adjusted under 35 U.S.C. 154(b) by 164 days.

(21) Appl. No.: 15/674,384

(22) Filed: Aug. 10, 2017

(65) Prior Publication Data

US 2019/0049962 A1 Feb. 14, 2019

(51) Int. Cl.
| | | |
|---|---|---|
| G05D 1/00 | (2006.01) | |
| B64C 39/02 | (2006.01) | |
| G01S 17/08 | (2006.01) | |
| G06T 7/00 | (2017.01) | |

(52) U.S. Cl.
CPC ......... G05D 1/0088 (2013.01); B64C 39/024 (2013.01); G01S 17/08 (2013.01); G06T 7/0004 (2013.01); *B64C 2201/123* (2013.01); *G06T 2207/10032* (2013.01); *G06T 2207/30108* (2013.01)

(58) Field of Classification Search
CPC ................ G05D 1/0088; G06T 7/0004; G06T 2207/10032; G06T 2207/30108; B64C 39/024; B64C 2201/123; G01S 17/08
See application file for complete search history.

(56) References Cited

U.S. PATENT DOCUMENTS

| | | | | |
|---|---|---|---|---|
| 2015/0236778 A1* | 8/2015 | Jalali | ..................... | H04W 84/06 |
| | | | | 370/316 |
| 2016/0004795 A1* | 1/2016 | Novak | ................ | G06F 17/5009 |
| | | | | 703/1 |
| 2016/0104098 A1* | 4/2016 | Matula | ................. | G06Q 10/083 |
| | | | | 701/23 |
| 2017/0108456 A1* | 4/2017 | Alizadeh | ............. | C04B 40/0007 |
| 2017/0270805 A1* | 9/2017 | Parker | ................... | B64C 39/024 |
| 2017/0307759 A1* | 10/2017 | Pei | .......................... | G01S 17/10 |
| 2018/0035606 A1* | 2/2018 | Burdoucci | ........... | A01D 34/008 |
| 2018/0059250 A1* | 3/2018 | Nakata | ..................... | G01S 19/46 |
| 2018/0089622 A1* | 3/2018 | Burch | .................. | G06K 7/1413 |
| 2018/0118337 A1* | 5/2018 | Viel | ....................... | B64C 39/024 |
| 2018/0139378 A1* | 5/2018 | Moriuchi | ................ | G06T 7/571 |
| 2018/0188747 A1* | 7/2018 | Venturelli | ............ | G08G 5/0069 |
| 2018/0321692 A1* | 11/2018 | Castillo-Effen | .......... | G05D 1/10 |
| 2018/0322699 A1* | 11/2018 | Gray | ..................... | G06T 19/003 |
| 2018/0329433 A1* | 11/2018 | Zhao | ...................... | G05D 1/104 |
| 2018/0329904 A1* | 11/2018 | Gupta | ................... | G06F 16/164 |
| 2019/0010750 A1* | 1/2019 | Scanu | ..................... | E05F 15/73 |
| 2019/0041856 A1* | 2/2019 | Hippelein | ............ | G05D 1/0094 |
| 2019/0066488 A1* | 2/2019 | Locke | .................. | G08B 29/185 |
| 2019/0072979 A1* | 3/2019 | Sukhomlinov | ...... | G01C 21/206 |

* cited by examiner

*Primary Examiner* — Mussa A Shaawat
(74) *Attorney, Agent, or Firm* — Ruben J. Rodrigues

(57) ABSTRACT

The present solution provides autonomous robotic technologies for industrial inspection that can flexibly scale to meet many different types of industrial inspection. By utilizing the autonomous robotic technologies disclosed herein, increasingly large and complex industrial inspections may be completed in a fraction of the time previously required for inspections of smaller scales.

20 Claims, 7 Drawing Sheets

AUTONOMOUS ROBOTIC TECHNOLOGIES FOR INDUSTRIAL INSPECTION

BACKGROUND OF THE DISCLOSURE

The inspection of industrial equipment and infrastructure can include the examination of confined spaces, requiring "confined space entry" by humans which is time consuming, expensive, and puts the individuals performing the inspection at risk. Because of the time and expense of such manual inspection mechanisms, risk-based prioritization is often applied to an industrial inspection such that higher-risk components are inspected while lower-risk ones (which may nonetheless also fail) go uninspected, contributing to a higher probability that an overall industrial system might fail. These manual inspection processes can also face data-loss issues, as human inspectors will often only record the minimal amount of information pertinent to an inspection, such as documenting a single reading that a visual inspection was conducted, failing to capture additional information that could be useful for determining the overall risk that an industrial system might fail. Because of their time and expense, these manual inspections are also often done as infrequently as possible, which increases the risk that an industrial system might fail between inspections.

SUMMARY OF THE DISCLOSURE

The present solution provides autonomous robotic technologies for industrial inspection that can flexibly scale to meet many different types of industrial inspection. By utilizing the autonomous robotic technologies disclosed herein, increasingly large and complex industrial inspections may be completed in a fraction of the time previously required for inspections of smaller scales. Furthermore, inspections can be more comprehensive, more information about the inspected structure can be collected, and inspections can be completed more frequently—drastically decreasing the risk that an overall industrial system may fail.

The present disclosure discusses sets of robotic devices that work cooperatively to accomplish a task, such as the inspection of an industrial structure. The industrial structures can include tanks, refinery facilities, pipes, ship hulls, among others. The robotic devices can work cooperatively to inspect internal structures of the industrial structure, such as the inner walls of a pipe.

The set of robotic devices can be a homogeneous set that can include one type of robot device (e.g., each of the robotic devices in the set can have the same configuration). In other implementations, the set of robotic devices can be heterogeneous, with the set including a plurality of specialized units that are configured to fulfill different specialized functions or tasks.

The robotic devices discussed herein can include "spherical sensing." The interior spaces of the industrial structure can present obstacles in any direction relative to the robotic device. For example, structures can hang from the ceiling of the industrial structure presenting obstacles not present when robotic devices fly in open spaces. The spherical sensing can be provided by infrared time-of-flight (IR ToF) sensors along, for example, the ±x, ±y, and ±z axes.

According to an aspect of the disclosure, an inspection system includes a base station that includes at least one processor. The base station can determine a first task and a second task of an inspection operation. The system can include an aerial robotic device that is configured to autonomously navigate within an internal structure. The aerial robotic device can be configured to perform the first task of the inspection operation on the internal structure. The system can also include a robotic device. The robotic device can be in communication with the aerial robotic device. The robotic device can be configured to autonomously navigate the internal structure and perform the second task of the inspection operation on the internal structure in coordination with the aerial robotic device.

In some implementations, the robotic device is a second aerial robotic device. In other implementations, the robotic device is a flightless robotic device. The first task of the inspection operation can include imaging a portion of the internal structure and the second task of the inspection operation can include lighting the portion of the internal structure. The aerial robotic device can include an imaging module and the robotic device can include a lighting module.

In some implementations, the robotic device is one of a communications relay robotic device, a data storage robotic device, a processing unit robotic device, a localization robotic device, or a gas sensing robotic device.

In some implementations, the inspection operation can be a non-destructive inspection operation that can include at least one of ultrasonic depth sensing, phased array ultrasonic sensing, pulsed eddy current (PEC) sensing, magnetic flux leakage (MFL) sensing, guided wave testing, terahertz evaluation, time of flight diffraction ultrasonic sensing, microwave imaging, two-dimensional imaging, or three-dimensional imaging.

According to an aspect of the disclosure, an aerial robotic device can include a first range sensor that can project at a first angle from a primary axis. The first range sensor can project towards a first plane. The aerial robotic device can also include a second range sensor that can project at a second angle from the primary axis. The second range sensor can project towards the first plane. The aerial device can also include a control system that can include at least one processor. The control system can receive a first range signal from the first range sensor. The first range signal can indicate a first distance to a wall. The control system can also receive a second range signal from the second range sensor. The second range signal can indicate a second distance to the wall. The control system can determine a difference between the first distance and the second distance. The control system can correct a gyroscope drift based on the difference between the first distance and the second distance.

In some implementations, the first angle and the second angle have the same magnitude. The first range senor can be a first IR ToF sensor and the second range sensor can be a second IR ToF sensor. The first range sensor can be mounted on a first boom of the aerial robotic device and the second range sensor can be mounted on a second boom of the aerial robotic device.

The control system can determine an orientation of the wall and can correct a global yaw measurement of the aerial robotic device based on the orientation of the wall. The control system can maintain a flight path along the wall. When traveling along the flight path, the control system can orient the aerial robotic device such that the first distance to the wall is substantially equivalent to the second distance to the wall.

According to an aspect of the disclosure, an aerial robotic device can include three range sensors. Each of the range sensors can project toward a different plane intersecting a primary axis of the aerial robotic device. The aerial robotic device can include a control system that has at least one processor. The control system can receive a range signal from each of the three range sensors. The control system can generate a flight control signal based on the range signal from each of the three range sensors, the flight control signal to control a flight path.

The three range sensors can be IR ToF sensors. The aerial robotic device can include a seventh range sensor that can project towards one of the planes interesting the primary axis of the aerial robotic device. The seventh sensor can be non-orthogonal to the plane. The aerial robotic device can include an inertial measurement unit, and the control system can generate the flight control signal based on a signal received from the inertial measurement unit.

In some implementations, the aerial robotic device can include an environmental sensor and a visual sensor. The environmental sensor can be one of an oxygen sensor, a carbon dioxide sensor, a nitrogen sensor, a temperature sensor, a humidity sensor, a hydrocarbon sensor, and a magnetic field sensor. The visual sensor can be one of a two-dimensional image sensor and a three-dimensional image sensor.

The foregoing general description and following description of the drawings and detailed description are exemplary and explanatory and are intended to provide further explanation of the invention as claimed.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
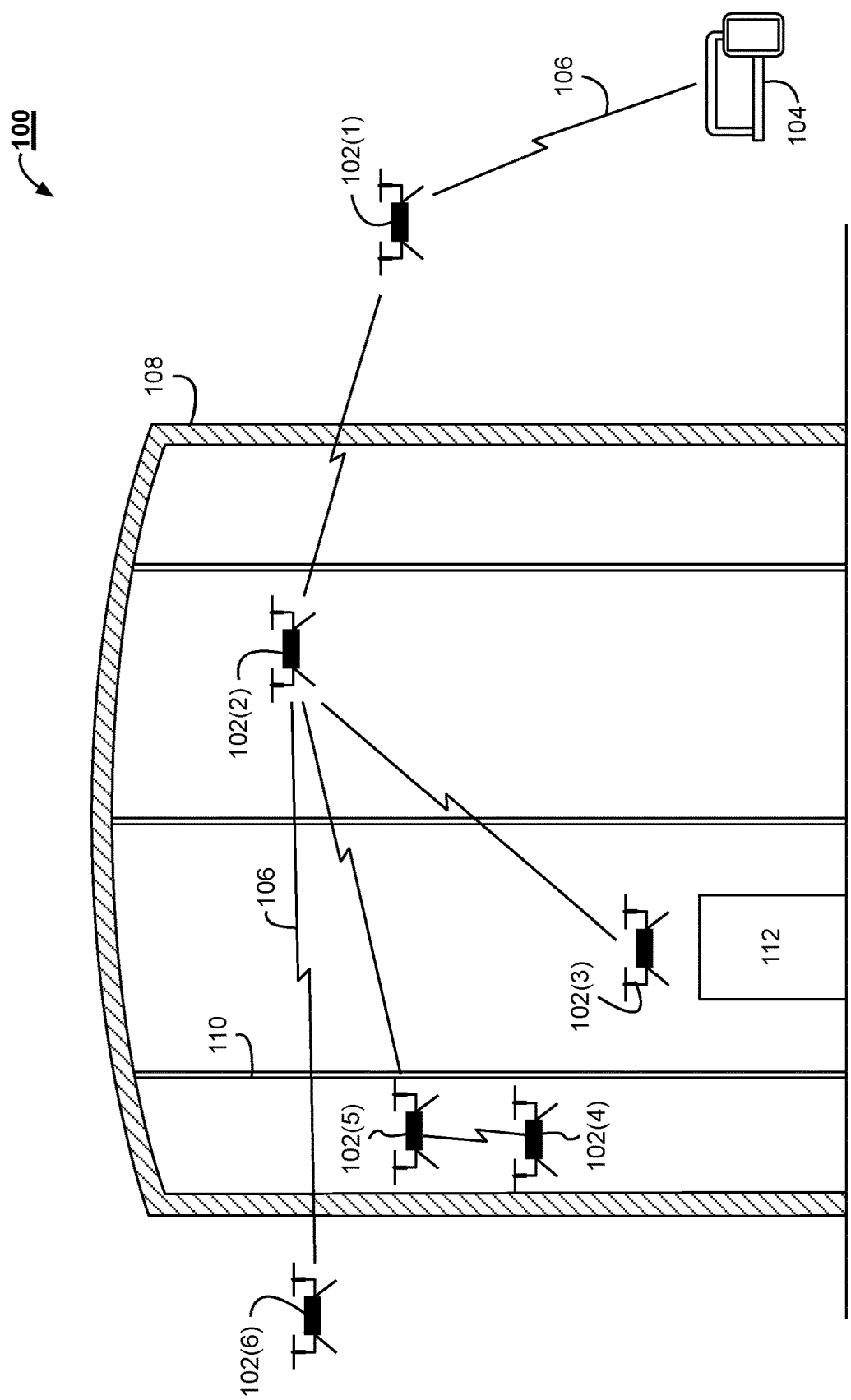
FIG. 1A illustrates an example robotic system for industrial inspection.

FIG. 1A illustrates an example system 100 for industrial inspection. The system 100 includes a plurality of robotic devices 102. While robotic devices 102 may be any form of robotic device, including mobile devices, stationary devices, wheeled devices, legged devices, rolling devices, crawling devices, flying devices, submersible devices, or any combination thereof, aerial robotic drones are demonstrated in the exemplary system of FIG. 1A. The robotic devices 102 may be homogeneous devices of the same type. In some implementations, the robotic devices 102 can include a heterogeneous set of devices. The heterogeneous set of devices can include different types of robotic devices that can include different, specialized functions, hardware, or software. The robotic devices 102 (both the homogeneous sets and heterogeneous sets) can work in cooperation with all the other devices of the set. The robotic devices 102 may also vary in terms of sensor package, behavior, or role within the cooperative robotic system.

The robotic devices 102 can communicate with a base station 104. Base station 104 may itself be a robotic device of any form or a non-robotic device. The robotic devices 102 can communicate directly with the base station 104 (via a wireless network) or through a wireless network 106 that is formed between the robotic devices 102. The network 106 can be referred to as a mesh network 106. The robotic devices 102 can work individually or cooperatively to inspect an industrial structure 108. The industrial structure 108 can include, for example, tanks, distillation columns, refinery facilities, smoke stacks, boilers, cokers, pipes, and ship hulls. The industrial structure 108 may be empty, or may contain gases or fluids. The industrial structure 108 can include internal obstacles 110 that the robotic devices 102 avoid during inspection of the industrial structure 108. The internal obstacles 110 can include support structures, fluid or material stored or contained within the industrial structure 108, or other structures (such as piping, tubing, or wiring) within the industrial structure 108. The industrial structure 108 can also include reference locations 112 by which the robotic devices 102 can determine their location within (or around) the industrial structure 108. The reference location can include openings, doorways, structures within the industrial structure 108, or can include arbitrary locations within the industrial structure 108.

The inspection demonstrated in FIG. 1A may begin by providing to the system information concerning industrial structure 108 and identifying a potential point of entry, such as the reference location 112. In the example of FIG. 1A, the industrial structure 108 is a tank with an opening that provides for ingress and egress to the internal compartments of industrial structure 108. In an exemplary implementation, the industrial inspection may commence by providing system 100 with limited information concerning the industrial structure to be inspected. For example, system 100 may be provided with information concerning the type of industrial structure to be inspected (e.g., tank, pipe, ship hull, refinery equipment, etc.), the overall rough dimensions of the industrial structure to be inspected (e.g., height, width, etc.), an identification of a reference locations 112 for the robotic devices, or any combination thereof. This limited information may be provided via computerized user interface in planning software, which may be provided at the inspection location, from a remote location, or loaded into system 100 prior to deployment. Using this limited information, the planning software may determine what types of robotic devices should be deployed for a particular industrial inspection (including the appropriate mix of different types of specialized robotic devices that should be utilized in order to optimize efficiency and speed) and would make sure that the appropriate heuristics and initial instructions are loaded for each device. For example, the larger the industrial structure, the more robotic devices are likely needed. Similarly, the more complicated the internal structure is likely to be, more specialized robotic devices that may cooperatively assist with navigation may be needed, as explained in more detail below.

After planning an industrial inspection utilizing the planning software, the robotic devices 102 may be loaded with a preliminary map of the environment generated by the planning software according to the information input into the planning software. This map may be derived from rough geometric information (such as height, width, and shape (e.g., a cylinder for a tank)), information specific to a particular type of industrial structure (e.g., a specific kind of tank or pipe), a CAD model of the structure if available, or even information obtained from a prior inspection conducted by system 100.

Prior to the beginning of the industrial inspection of industrial structure 108, the robotic devices 102 are placed in proximity to a reference point 112 that enables ingress and egress to the industrial structure 108 to be inspected. Industrial inspection of the industrial structure 108 utilizing system 100 would begin the inspection by sending one or more of robotic devices 102 to the point of entry 112 to begin inspection. The robotic devices 102 may then begin the inspection and may collect more detailed information concerning the dimensions of industrial structure 108, including the location and size of internal obstacles 110 which is then communicated to other robotic devices 102 and/or base station 104. The system 100 may then use this more detailed information to help guide the remainder of robotic devices 102 through the industrial inspection.

In some implementations, and prior to the deployment of other robotic devices, a robotic device 102 certified for use in hazardous environments with gas-sensing equipment may be initially deployed into (or around) the industrial structure 108 through an access point and determine whether flammable, explosive, or other hazardous gases are present in order to determine whether it is safe to proceed with the industrial inspection and introduce other robotic devices 102 into the industrial structure 108. In some implementations, a plurality of robotic devices 102 may subsequently enter the industrial structure 108 and position themselves in fixed positions in order to provide positioning data to other units that may subsequently enter industrial structure 108. For example, robotic device 102(2) may be a Communications Relay Unit that position itself in the middle of industrial structure 108 in order to maximize the efficacy of communication within industrial structure 108 and the range of communications within industrial structure 108. In some implementations, multiple Communication Relay Units may be used to accomplish this task if, for example, the industrial structure spans a wide area over which the broadcast signal (e.g., the mesh network 106) generated by the robotic device 102(1) cannot cover. In some implementations, a plurality of robotic devices 102 with sensors and other inspection equipment may then enter the industrial structure 108 in order to complete the inspection.

In some implementations, and in particular where the area to be inspected is large, a subset of robotic devices cooperatively working together and may venture out of range of communication with the remainder of network 106. In some implementations, such and out-of-range subset of robotic devices would continue to work cooperatively and store collected data locally until it is capable of reconnecting with network 106 in order to provide collected data to other robotic device 102 or back to base station 104. In some implementations, the robotic devices 102 may monitor local data storage to determine whether they have sufficient storage to proceed with their inspection-oriented tasks or whether they should return to a position where they may communicate with the network in order to off-load collected data. In some implementations, such an out-of-range subset may comprise a Data Storage Device that may be utilized for storage of collected data while the subset remains out of communication range.

The system 100 can include one or more robotic devices 102. While robotic devices 102 may be any form of robotic device, including mobile devices, stationary devices, wheeled devices, legged devices, rolling devices, crawling devices, flying devices, submersible devices, or any combination thereof, aerial robotic drones (sometimes referred to as unmanned aerial vehicles or "UAVs") are demonstrated in the exemplary system of FIG. 1A. In some implementations, the robotic devices 102 are multirotor helicopter-type devices, such as quadcopters. The plurality of robotic devices 102 can work cooperatively (and may be sometimes collectively referred to as a "swarm") or individually to inspect the industrial structure 108.

As an overview, the plurality of robotic devices 102 can each be of the same design, which can be referred to as a homogeneous set, or can include a plurality of heterogeneous designs, which can be referred to as a heterogeneous set. Different robotic devices 102 within a cooperative network can include different types of specialized units, which can include specialized hardware or software. For example, robotic device 102(1) can be a communication relay drone that includes additional or larger antenna to enable a network 106 between the base station 104 and the robotic devices 102(2)-102(5). The robotic device 102(1) and robotic device 102(6) can cooperatively work together to inspect the industrial structure 108. The robotic devices 102(2)-102(5) can cooperatively work together to inspect the internal portion of the industrial structure 108. The robotic device 102(3) can be a localization drone that can maintain a position near a known reference location 112 (e.g., a door to the industrial structure 108). The robotic devices 102(2), 102(4), and 102(5) can determine their location within the industrial structure 108 based on data from the localization robotic device 102(3). In another example, the robotic device 102(4) can be a camera drone and robotic device 102(5) can be a lighting drone that provides additional lighting for the cameras of the robotic device 102(4). These exemplary drones may work together cooperatively to perform the inspection (e.g., robotic device 102(2) can provide a location reference, while 102(4) can have a camera for observing and inspecting, assisted with light from robotic device 102(5)).

The system 100 may be scalable in that an arbitrary number of robotic devices 102 may be utilized as needed for a particular industrial inspection. In some implementations, the system 100 may begin inspection with a smaller set of drones and then additional drone units may be added as the inspection proceeds. For example, during inspection, one or more robotic devices 102(2) and 102(3) may determine that a particular or specialized type of drone may be required to inspect a certain area or feature of the industrial structure 108. A particular or specialized type of drone may be required because of location constraints, size constraints, or because a specialized type of sensor or camera is required to properly complete and inspection. In such an example, robotic device 102(2) may communicate the need for a particular or specialized type of drone back to base station 104 through network 106. In response to said need, the system 100 may deploy one or more previously undeployed drones appropriate to satisfying the identified task. The previously undeployed drones may be waiting in a staging area (e.g., the back of a truck or van) for deployment during inspection until needed during the inspection. Once the undeployed drones have completed the specific task for which they are best suited, the drones may return to a staging area until needed again in the future. In one example, the system 100 may add additional robotic devices 102 to act as communication relay units as the robotic devices 102 performing inspection tasks progress further into the industrial structure 108. In another example, the system 100 may add additional robotic devices 102 acting as data storage units if the internal structure or other signals interferer with the inspecting robotic devices 102 ability to transmit signals via the network 106 back to the base station 104. The data storage drones can be positioned within the broadcast range of the inspecting drone and collect data from the inspecting drone, which can later be downloaded to the base station 104.

In some implementations, system 100 may be scalable in size, deploying a different number of robotic devices 102 at any given time depending on the areas needed to be inspected. For example, the industrial inspection may commence but the system 100 may learn, via robotic devices 102, that the use of additional drones my optimally speed up the overall inspection and that there is enough room within industrial structure 108 for additional drones to operate. In response to such a situation, the system may deploy additional robotic devices 102 in order to inspect more components and surfaces in a timelier fashion. Similarly, as the inspection proceeds, the system 100 may determine that there is an excess number of robotic devices 102 deployed for inspection and some drones may be recalled back to a staging area. Such a circumstance may occur, for example, in the event that the inspection is nearing completion and a smaller number of drones may efficiently complete the job.

In some implementations, robotic devices 102 may not only avoid obstacles 110, such as internal supports, but collect information concerning obstacles 110, such as the location or size of obstacles 110. Robotic devices 102 may share information concerning obstacles 110 with other robotic devices 102 or the base station 104. In some implementations, a map of the internal structure of industrial structure 108 may be created using information collected from robotic devices 102. A map of the internal structure may, for example, detail the size and location of internal obstacles 110. In some implementations, robotic device 102 may rely on a map of the internal structure of industrial structure 108 for navigation within the internal structure. In some implementations, robotic devices 102 may update the map of the internal structure as they collect information during inspection. For example, a robotic device 102 may determine a more precise location or size for obstacle 110 and use this information to either update the map of the internal structure and share it with others, or the robotic device 102 may share the information concerning the more precise location or size for obstacle 110 with other robotic devices 102 or the base station so that the map of the internal structure can be updated across the system.

Each robotic device 102 may have a particularized set of sensors for data collection, tools, or equipment which may be utilized in aiding an industrial inspection. While the sensors, tools, or equipment may vary from device to device, exemplary sensors, tools, or equipment may include: cameras, lights (including light emitting diodes (LEDs) or other forms of lighting), infrared (IR) time-of-flight sensors, IR time-of-flight stereo cameras, other IR sensors, other stereoscopic cameras (including, for examples, those used on borescopes), forward looking infrared (FLIR) sensors or cameras, near-IR sensors or cameras, other thermography sensors, gas detection sensors (e.g., lower explosive limit (LEL) sensors, oxygen sensors, benzene sensors, etc.), ultrasonic sensors, eddy current sensors, other non-destructive testing (NDT) sensors, environmental sensors (e.g., temperature sensors, humidity sensors, particulate matter sensors), single-point ranging sensors, LIDAR sensors, or multi-point ranging sensors, robotic arms (whether telescopic, hinged, or of some other variety), devices capable of releasing pressurized gas (such as pressurized air canister capable of blasting or spraying a surface), and devices capable of collecting samples. Additional details concerning the equipment and sensors that may be utilized on robotic devices 102 is further provided throughout this disclosure.

Examples of the specialized robotic devices 102 for use in the system 100 can include any of the following types of robotic devices, as well as additional types of specialized or general purpose robotic devices. The robotic devices 102 can be modular such that specialized hardware or software modules can be added to a robotic device 102 configured in a default configuration.

In some implementations, one or more of the robotic devices 102 can be configured as Communication Relay Devices. The Communication Relay Devices can be configured to relay the network 106 between robotic devices 102 and the base station 104. Communication Relay Devices may be capable of more powerful radio frequency (RF) communication. For example, the Communication Relay Devices can transmit a wireless signal a farther distance than robotic devices 102 configured in a default configuration. Communications Relay Devices may have access to more power than other devices (by, for example, having additional power sources on board). Communication Relay Devices may also have more powerful and advanced RF communications chipsets that other devices. Communication Relay Devices may position themselves in static positions during industrial inspection so that they may provide connectivity to other devices in the network. Accordingly, Communication Relay Devices may act as a "bridge" in the network 106 of the system so as to facilitate communications between robotic devices 102 conducting an inspection who may otherwise be out of communication range with other devices or the base station. In the example of FIG. 1A, robotic device 102(1) may serve as a Communication Relay Device facilitating communication between the base station 104 and other robotic devices 102 of system 100.

In some implementations, one or more of the robotic devices 102 can be configured as Data Storage Devices. Data Storage Devices may have increased data storage capabilities. Data Storage Devices can include local storage in the form of memory (for example, solid state memory or any other form of data storage mechanism). A Data Storage Device may receive data from other robotic devices 102 and store the data locally within the Data Storage Device. In such an example, instead of sending the data throughout the wireless network 106 and back to the base station 104, the system 100 may conserve network bandwidth, power, and resources for particular data-intensive functions by having the Data Storage Device physically return the data (rather than wirelessly transmitting it) to the base station 104. In some implementations, the robotic devices 102 can transmit inspection or other data to a Data Storage Device when the robotic devices 102 are out of transmission range of the base station 104. The data stored within a Data Storage Device can be downloaded to the base station 104 at a later time.

In some implementations, one or more of the robotic devices 102 can be configured as Enhanced Processing Devices. Enhanced Processing Devices may have greater processing capabilities than other robotic devices 102 or can have more processing resources available for processing data as compared to other robotic devices 102. Enhanced Processing Devices may have more advanced processors or specialized chipsets capable of performing more complex calculations in a faster period of time. In some implementations, the Enhanced Processing Devices can include application-specific integrated circuits (ASIC) or field programmable gate arrays (FPGAs) that are configured for a specific type of inspection. For example, the Enhanced Processing Device can include an ASIC configured to visual analysis of image data.

The Enhanced Processing Devices may also have increased power supplies to support enhanced processing functions. The Enhanced Processing Devices can also include increased memory capabilities. Enhanced Processing Devices may make their enhanced processing capabilities available to other units or devices via a wireless network. While an Enhanced Processing Device may be utilized in any instance where enhanced processing capabilities may be desired, examples include situations where complex sensor data needs to be processed and analyzed on-demand prior to being communicated back to a base station 104. For example, if system 100 needs to process visual images collected from robotic device 102(5), it may do so by communicating those visual images to robotic device 102(3) which may be an Enhanced Processing Device. This may be desired, for example, when the system requires on-demand path planning and coordination for other drones in the system based on collected image data, but where robotic device 102(5) itself does not have the processing capabilities necessary for analyzing visual data to perform path planning or other coordination functions.

In some implementations, Enhanced Processing Devices may also be utilized where simultaneous localization and mapping capabilities (SLAM) are desired. In this way, Enhanced Processing Devices may provide the enhanced processing capabilities for constructing and updating a map for navigating and inspecting industrial structure 108, and tracking the robotic devices 102. Additionally, by focusing enhanced processing on Enhanced Processing Devices, lower-power consuming inspection drones can proceed with inspection while higher-power consuming Enhanced Processing Devices may be "swapped out" of the system. Similarly, any other devices of either specialized or general purpose may perform their duties within system 100 and be "swapped out" with other devices as they exhaust their power resources. In such exemplary implementations, each device 102 may be capable of monitoring its own power supply and would communicate with other devices and/or the base station when its power supplies are running low and it needs to be "swapped out." The base station may then initiate communication through network 106 to another device (whether already deployed or undeployed) and would proceed to replace the role of the device whose power is depleting.

In some implementations, one or more of the robotic devices 102 can be configured as Localization Devices. Localization Devices can carry equipment for providing navigational reference to the system and other devices, such as LIDAR, visual cameras, and impulse radio ultra-wideband (IR-UWB). Localization Devices may also carry increased power supplies for supporting localization functions. Localization Devices may be directed to a static location and be utilized as a localization reference for other units. For example, the Localization Devices can be positioned near reference locations 112 or obstacles 110. The Localization Devices can act as way-points along flight paths that the drones 102 can navigate along to travel through the industrial structure 108 without coming into contact with the walls or other obstacles 110.

In some implementations, localization between devices may be achieved via acoustic localization. In such an implementation, a highly accurate clock synchronization may be achieved and each device may be assigned a unique acoustic signal (e.g., a unique "chirp") as well as timing instructions for emitting said acoustic signal. Other devices, using multiple microphones per unit so as to detect angle of arrival, may then determine the distance and orientation (range and bearing) to the unit from which said unique acoustic signal originated by, for example, relying on a comparison of the arrival time and the known transit time as referenced by the synchronized clocks of the units.

In some implementations, one or more of the robotic devices 102 can be configured as Illumination Devices. Illumination Devices can carry lights (such as light emitting diodes (LEDs) or other lighting equipment) as well as increased power supplies for supporting lighting. The Illumination Device can work in cooperation with Visual Inspection Devices. For example, an Illumination Device can illuminate an area that a Visual Inspection Device is imaging. Illumination Devices may be utilized even in implementations where other devices also have lighting. For example, illumination from other angles or axis may be desired even where a separate robotic device 102 has both a visual camera and a light itself. Such an exemplary implementation may be of particular utility when attempting to visually inspect a possible crack in a surface, which may be more easily discerned when lit from certain angles. In the example system 100, robotic device 102(5) can be an Illumination Device that is illuminating a wall portion of the industrial structure 108 that the robotic device 102(4) is imaging.

In some implementations, one or more of the robotic devices 102 can be configured as Visual Inspection Devices. Visual Inspection Devices may carry visual or optical sensors (such as cameras) for capturing high resolution images or other visual data. Visual Inspection Devices may also have enhanced processing and greater power supply resources than other devices in order to do "first-pass" analysis of visual data (for example, attempting to detect whether cracks or corrosion exists on a particular surface). The optical sensors of the Visual Inspection Devices can be visible or non-visible light sensors. For example, the optical sensors can be infrared optical sensors.

In some implementations, one or more of the robotic devices 102 can be configured as Gas Sensing Devices. Gas Sensing Devices may be utilized to determine the presence of particular gases within an industrial structure or area. Gas Sensing Devices can be deployed early during an inspection to determine whether hazardous or potentially explosive gases are present which may pose a risk to the completion of the remainder of the inspection, whether by humans or other robotic devices. The Gas Sensing Devices could be hazardous environment compliant (e.g., in compliance with NEC, IEC, or ATEX requirements) such that they operate safely in the presence of combustible hydrocarbons. It should be noted that any other robotic devices for use in exemplary system 100 may also be made hazardous environment compliant.

In some implementations, one or more of the robotic devices 102 can be configured as Non-Destructive Testing (NDT) Devices. NDT Devices can include NDT sensors and instrumentation, such as ultrasonic depth or eddy current sensors. NDT devices may be configured to make sustained contact with (or fly substantially close to) a surface or elements to be tested. These devices could be used, for example, to collect a large number of wall-thickness measurements over the surface of a storage tank. The NDT Devices can include sensors for ultrasonic depth sensing/testing (UT), phased array ultrasonics (PA), PEC, magnetic flux leakage (MFL), guided wave testing (GWT), terahertz evaluation, time-of-flight diffraction ultrasonics, microwave imaging, or any combination thereof.

In some implementations, a robotic device 102 can be configured for more than one of the configurations described herein. For example, a Localization Device can also be configured as an Enhanced Processing Device or a Data Storage Device.

The robotic devices 102 of system 100 may engage in many different cooperative endeavors in order to perform industrial inspection. At times, a subset of robotic devices 102 may be acting cooperatively, whereas at other times, all deployed robotic devices 102 may be, to some extent, acting cooperatively in order to perform a task. While any form of cooperation is contemplated in the present invention, the following exemplary cooperative behavior may be particularly advantageous in performing an industrial inspection with system 100.

In some implementations, one or more of the robotic devices 102 can cooperate to provide assisted lighting. For example, one or more Illumination Devices may provide supplemental lighting to NDT Device or Visual Inspection Devices. In some implementations, additional lighting is provided to enhance the collection of sensor data, including visual data. Assisted lighting may also be beneficial in assisting other devices with navigation or mapping functions.

In some implementations, one or more of the robotic devices 102 can cooperate to provide communication daisy chaining to enable a mesh network. The robotic devices 102 may be strategically positioned to cooperate with one another and create a persistent communications backbone that may be utilized by system 100. This backbone may be utilized to relay communication throughout an inspection area back to a base station 104 as well as to other devices in system 100. The communication daisy chaining may comprise of multiple branches of communication chains made up of multiple devices forming part of an overall daisy chain of devices.

In some implementations, one or more of the robotic devices 102 can cooperate to provide sweeping and scanning capabilities. A plurality of devices may cooperate to maintain a geometry relative to a surface as they move across it (e.g., to "sweep" across or "scan" the surface). For example, a plurality of units may position themselves in a cooperative fashion with minimal or no overlap with regard to sensing regions (for example, the field of view of their visual sensors) in order to collect data simultaneously across a larger area than would be capable using a single device. The data may then be communicating amongst the devices or back to the base station.

In some implementations, one or more of the robotic devices 102 can cooperate to automatically swap out robotic devices 102. The robotic devices 102 described herein can have a limited amount of resources, such as power resources and storage resources. The duration of an industrial inspection can be longer than the power supply life of a specific robotic device 102. In some implementations, a robotic device 102 can monitor its own power supply level and determine when power level is low. In some implementations, power supply information may be relayed through the wireless communication network 106 back to a base station 104, and base station 104 may determine that a robotic device 102 will shortly run out of power and needs replacement. When it is determined that a robotic device 102 should be replaced, a replacement robotic device 102 of the same type may receive a communication that indicates that it will be deployed as a replacement for another device. In some implementations, this communication may originate from the device to-be replaced without interacting with the base station 104. In other implementations, the base station 104 or a central control system may be involved. The replacement device would then cooperatively interact with the robotic device 102 to be replaced in order to seamlessly take over the tasks that were being completed by the device to be replaced. (e.g., automatically swapping it out). The device being replaced may then proceed to a recharging platform where its power supplies would be replenished (in some implementations, utilizing wireless power supply recharging technologies such as an inductive charging pad and receiver).

In some implementations, one or more of the robotic devices 102 can cooperate to provide navigation capabilities. Some environments in which autonomous robotic technologies for industrial inspection can operate may contain unpredictable internal obstacles 110. The obstacles 110 can include columns and other support structures, accumulations of debris, blockages, obstructions caused by damage to industrial structures, and any combination thereof. In some implementations, different robotic devices 102 can be configured to include different sensors for detecting different types of obstacles.

In some implementations, the environment can include a plurality of similar obstacles or features (the obstacles and features can collectively be referred to as features). When mapped by a single robotic device 102, the similar features can introduce perceptual aliasing because when visualized the robotic devices 102, the robotic devices 102 may not be able to tell if the robotic device 102 is located at a first iteration of the feature or a second iteration of the feature. The cooperative use of the robotic devices 102 can provide an advantage in navigating within industrial structures that are being inspected that include the similar, repeating features. In some implementations, IR-UWB, ultrasonic, or other inter-unit ranging methods may be utilized in combination with other navigational approaches (including, for example, filters in SLAM). In such implementations, perceptual aliasing can be reduced because the cooperating robotic devices 102 can determine that the similar, repeating features are located at different locations (rather than a single feature that the drone passed by several times). In some implementations, robotic devices 102 with visual sensors, IR sensors, or LIDAR sensors may share information when they detect other robotic devices 102 (including, for example, sharing range and bearing information). In such implementations, a high-fidelity position relative to the observed device may be determined from said information. In some implementations, device may be able to derive relative vectors between each other based on RF signals, which would allow for devices cooperatively working together to construct a global navigation solution according to combination of the known vectors between devices and a fixed known point (such as a device positioned at the entrance to the internal compartment of an industrial structure).

In some implementations, one or more of the robotic devices 102 can cooperate to provide cooperative map building. The robotic devices 102 can cooperatively work together to aggregate data about the environment being inspected in order to create a unified map of the environment which may be shared throughout the system 100 and with other robotic devices 102, without each of the robotic devices 102 needing to independently explore the environment. In some implementations, each robotic device 102 may collect sensor data concerning the environment and process the sensor data (e.g., IR data, or visual data) into a localized, world-map. The robotic device 102 can broadcast the localized world map to other robotic devices 102 so that the other robotic devices 102 may incorporate the world-map information into their own localized world-maps. In some implementations, specialized robotic devices 102, with enhanced visualization capabilities, may be used to collect information for map-building which is then propagated to all other devices in the system. In some implementations, the robotic devices 102 can transmit their localization data to the base station, which can generate a world-map from the robotic devices 102. The base station 104 can transmit the compiled world-map back to each of the respective robotic devices 102.

The system 100 can also include a base station 104. The base station 104 is described further in relation to FIG. 2. As an overview, the base station 104 can be a computing unit such as a laptop, tablet device, desktop computer, or other data processing system that can control, program, or otherwise interact with the robotic devices 102. In some implementations, the base station 104 can be used to directly pilot or control the robotic devices 102. In some implementations, the base station 104 can be used to generate routes and program the routes into the robotic devices 102. The robotic devices 102 can then autonomously fly the programmed routes. In some implementations, the base station 104 may be in communication with planning software utilized to plan an industrial inspection, and received information from said planning software.

In some implementations, a user can program an inspection operation into the base station 104 that is to be completed by the robotic devices 102. The inspection operation can be a non-destructive measurement test. The base station 104 can divide the inspection operation into a plurality of tasks. The base station 104 can assigned a task to each of the robotic devices 102. For example, if the inspection operation is to visually inspect the wall of a holding tank, the base station 104 can divide the test into lighting tasks and visual inspection tasks. Each of the lighting and visual inspection tasks can be to light or visually inspect a portion of the holding tank. Once programmed with a task, each of the robotic devices 102 can cooperatively perform their assigned task. The inspection operation can include imaging components of the industrial structure 108; identifying blockages or the accumulation of debris in the industrial structure 108; identifying weakness, erosion, cracks, or other structural damage to the industrial structure 108; detecting leaks or spills; monitoring and recording environmental conditions (e.g., temperature, humidity, etc.); determining chemical concentrations in the industrial structure 108 and surrounding environment; and data collection.

The system 100 can be used to inspect industrial structures 108. The industrial structure 108 can include tanks, distillation columns, refinery facilities, smoke stacks, boilers, cokers, pipes, and ship hulls. or a component thereof. The industrial structure can include obstacles 110, which can be internal or external to the industrial structure 108. The obstacles 110 can include support structures, accumulations of debris, blockages, obstructions caused by damage to industrial structures, and any combination thereof.

The system 100 can utilize network 106 for communication. The network 106 can be a wireless network. The network 106 can include any known networking technology. In some implementations network 106 can include a wireless network utilizing RF communication. In some implementations, network 106 may be, whether in whole or in part, a wireless mesh network, including a wireless mesh network that utilizing RF communication. In some implementations, network 106 may utilize protocols and schemes for managing wireless interferences among devices, including those known for abating interference within wireless mesh networks utilizing RF communications. In other implementations, network 106 may utilize acoustical or optical communication channels. In other implementations, network 106 may utilize electrical communication channels, including wired communication channels.

Figure 1B:
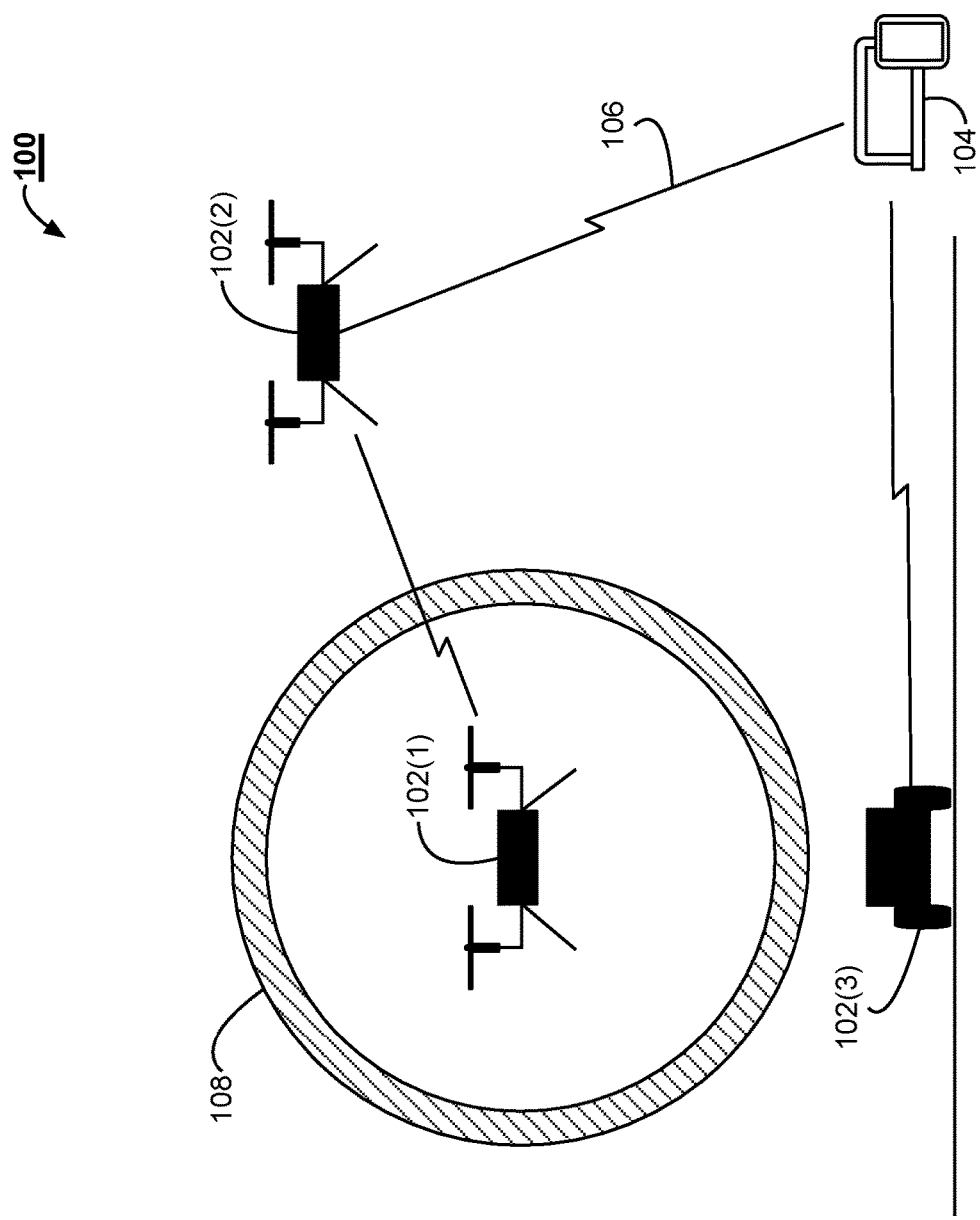
FIG. 1B illustrates an example robotic system for industrial inspection.

FIG. 1B illustrates another configuration of the example robotic system 100 for industrial inspection. As illustrated in FIG. 1B, the robotic devices 102 are inspecting an industrial structure 108. As illustrated in FIG. 1B, the industrial structure 108 is a pipe. The system 100 includes a heterogeneous set of robotic device 102. For example, the robotic devices 102(1) and 102(2) are configured as aerial robotic devices. The robotic device 102(1) can use the below described "spherical sensing" to maintain a flight path substantially in the middle of the pipe 108. The robotic device 102(2) can be configured as an aerial communication relay robotic device. The robotic device 102(3) can be configured as a rolling robotic device that can drive along the underside of the pipe 108 to inspect the underside of the pipe 108.

Figure 2:
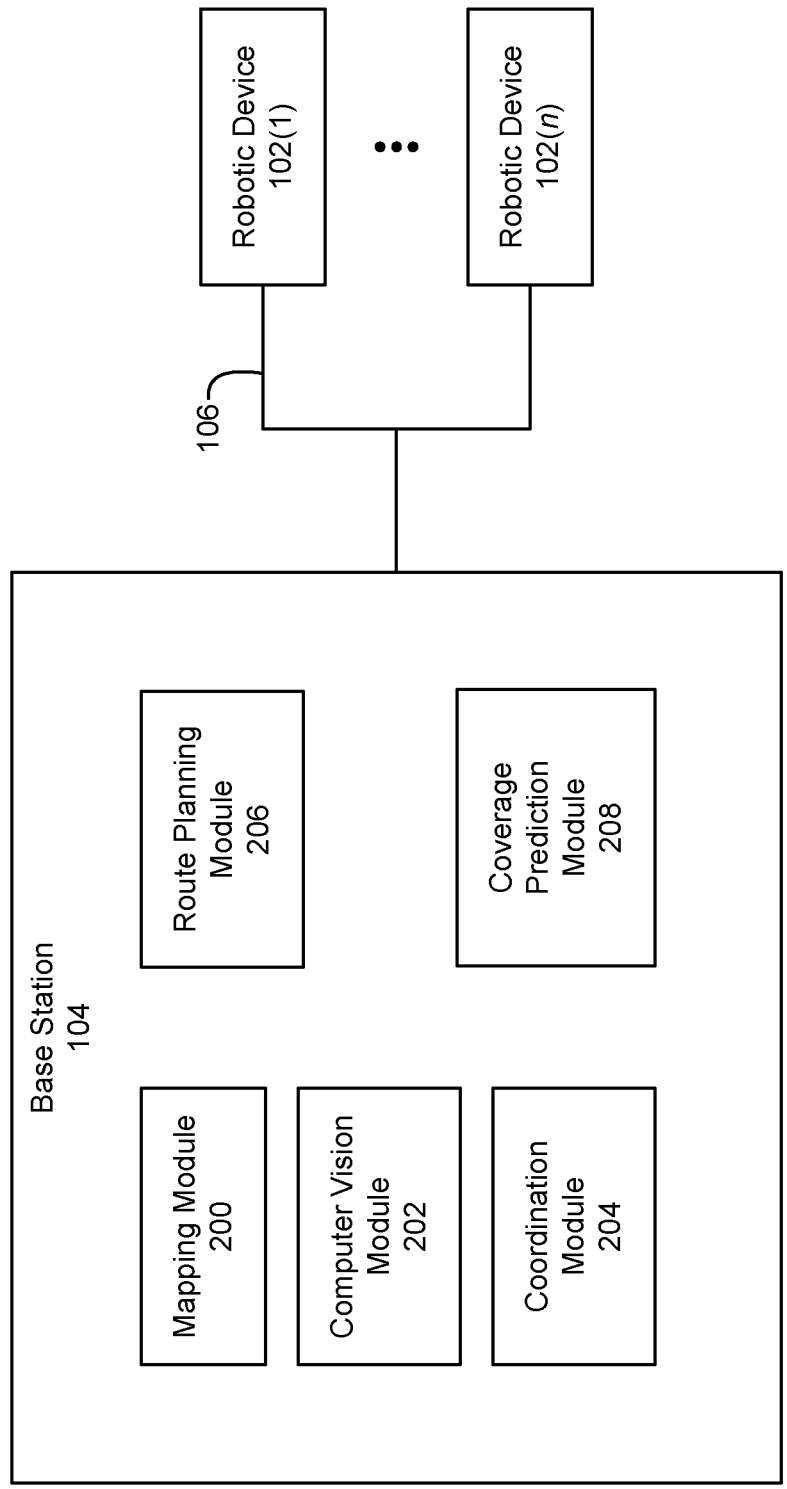
FIG. 2 illustrates a block diagram of an example base station for use in the robotic system illustrated in FIGS. 1A and 1B.

FIG. 2 illustrates a block diagram of an example base station 104 for use in the system 100 illustrated in FIG. 1A. The base station 104 may include a plurality of modules to perform the functions of the base station 104. The modules can be stored as executable instructions on a memory unit of the base station 104. The base station 104 can include at least a processor that executes the instructions to perform the functions of the modules. The base station 104 may include a mapping module 200, a computer vision module 202, and a coordination module 204. The base station may also include a route planning module 206, a coverage prediction module 208, and a load balancing module 210. The base station 104 can be a central point for data collection. In some implementations, the capabilities of base station 104 may also be distributed across one or more robotic devices 102 in a system for industrial inspection. In some implementations, each of the robotic devices 102 can include an individual iteration of one or more of the modules described in relation with the base station 104. In some implementations, the functions of the base station 104 are distributed across one or more robotic devices 102 and the system does not include a stand-alone base station 104 as illustrated in FIGS. 1 and 2.

The base station 104 can include a mapping module 200. The mapping module 200 can be any script, file, program, application, set of instructions, or computer-executable code that is configured to enable a computing device on which the mapping module 200 is executed to generate a localized map of the industrial structure and surrounding environment. Each of the robotic devices 102 can also include a mapping module 200. The mapping module 200 can generate a map of the environment surrounding the robotic devices 102. The mapping module 200 can stitch together mapping data generated by each of the robotic devices 102. In some implementations, the mapping module 200 can be preloaded with a starting map model. The starting map model can include a CAD file, a user-generated template, or information about the industrial structure 108. The mapping module 200 can combine the visual and ranging sensor data from one or more robotic devices 102 to generate and update maps. In some implementations, the maps can be updated to include the location of obstacles located by the robotic devices 102 or the location of referred locations. As data is collected by the robotic devices 102, the robotic devices 102 can include location information with the generated data. The mapping module 200 can map the data to locations on a map of the industrial structure.

The base station 104 can include a computer vision module 202. The computer vision module 202 can be any script, file, program, application, set of instructions, or computer-executable code that is configured to enable a computing device on which the computer vision module 202 is executed to perform computer vision tasks on the visual inspection data generated by each of the robotic devices 102. Each of the robotic devices 102 can include a computer vision module 202. The computer vision module 202 can process the image data captured by the drones and identify features within or of the industrial structure. For example, the computer vision module 202 can identify obstacle within the industrial structure. In some implementations, the computer vision module 202 can identify defects, cracks, damage, or accumulation of material in the industrial structure.

The base station 104 can include a coordination module 204. The coordination module 204 can be any script, file, program, application, set of instructions, or computer-executable code that is configured to enable a computing device on which the coordination module 204 is executed to divide inspection tasks into individual tasks for be performed by the robotic devices 102. For example, the inspection task can be to perform a non-destructive measurement test of an industrial structure. The coordination module 204 can divide the measurement test into a plurality of tasks, such as lighting, communication relay, computational processing, and visual inspection. The coordination module 204 can then assign the tasks to one or more of the robotic devices 102.

The base station 104 can include a route planning module 206. The route planning module 206 can be any script, file, program, application, set of instructions, or computer-executable code that is configured to enable a computing device on which the route planning module 206 is executed to generate routes for the robotic devices 102. The route planning module 206 can generate pre-programmed paths that can be programmed into the robotic devices 102. The paths can include one or more waypoints or reference points over which the robotic devices 102 pass.

The base station 104 can include a coverage prediction module 208. The coverage prediction module 208 can be any script, file, program, application, set of instructions, or computer-executable code that is configured to enable a computing device on which the coverage prediction module 208 is executed to what percentage of the industrial structure. The coverage prediction module 208 can provide progress updates to a user. For example, the prediction module 208 can indicate to the user the percent of the industrial structure inspected by the drones 102. In some implementations, the coverage prediction module 208 can determine the number of robotic devices 102 that are needed to complete an inspection task within a given time frame.

Figure 3:
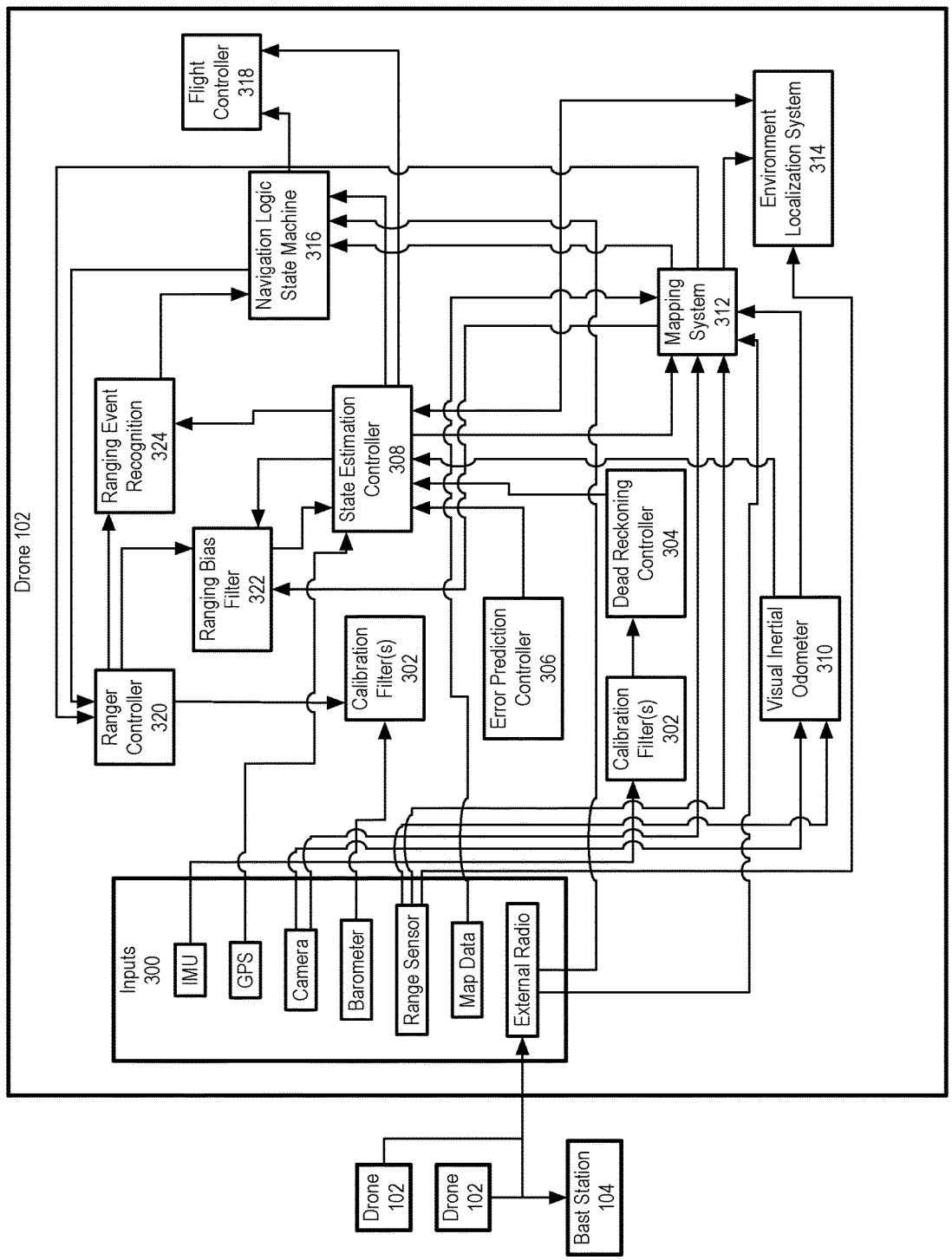
FIG. 3 illustrates a block diagram of an example control system for the robotic drones illustrated in FIGS. 1A and 1B.

FIG. 3 illustrates a block diagram of an example control system for the robotic devices 102 illustrated in FIG. 1A. The robotic device 102 can include a plurality of sensors 300. The sensors 300 can include at least one inertial measurement unit (IMU). The IMU can be a 6-degree of freedom (linear & rotational acceleration on three axes) or 9-axis (including 3-axis magnetometer data) inertial measurement unit. The sensors 300 can include a barometer to determine pressure, which can be used to determine altitude information. The sensors 300 can include a global positioning system (GPS) unit. When outdoors, the GPS unit can be used to determine the position of the robotic device 102. In some implementations, the robotic device 102 can include an IR-UWB to determine the drone's position indoors. The GPS and IR-UWB units can provide the absolute position of the robotic device 102. The sensors 300 can also include cameras or other optical sensors. The cameras can provide stereo vision. In some implementations, the camera can be thermal, IR, or IR-ToF cameras. The IR-ToF cameras can generate depth maps of the drone's environment. The sensors 300 can include range sensors. The range sensors can be IR-ToF sensors. The IR-ToF sensors can provide range information of nearby structures. The sensors 300 can include an external radio. The external radio can be used to transmit and receive data and instructions from the base station 104 and other robotic devices 102.

The control system can include calibration filters 302. The calibration filters 302 can provide to the IMU and the barometer sensors a correction signal that correct for biases within the sensors. The can use a calibration to be applied to correct for biases that can be generated by, for example, temperature variations.

The control system can include a dead reckoning calculator 304. The dead reckoning calculator 304 can provide navigation information by integrating data from the drone's IMU accelerometer and gyro data. The dead reckoning calculator 304 can determine the velocity and then position estimates from the integration of the acceleration data. The error prediction controller 306 can predict errors that can accumulate over time in the dead reckoning calculation and can provide the estimate to the state estimator 308 for correction.

The control system can include a state estimator 308. The state estimator 308 can include one or more Kalman filters. The state estimator 308 can combine noisy or inaccurate sensor data into the estimation of the device's state (e.g., the device's location, orientation, linear/rotational velocities). The control system can include a visual inertial odometer 310. The visual inertial odometer 310 can receive optical data from the cameras and calculate the velocity and rotation of the robotic device 102. The visual inertial odometer 310 can determine the velocity and the rotation of the robotic device 102 by tracking the movement of objects across frame of the optical data.

The control system can include a mapping system 312. The mapping system 312 can generate and maintain the device's internal map of an environment. The mapping system 312 can be preloaded with starting map model, such as from a CAD file or user-generated template. The mapping system 312 can combine visual and ranging sensor data to update the map by adding observed detail to the pre-loaded map and noting obstacle locations.

The control system can include an environmental localization system 314. The environmental localization system 314 can determine the drone's location with an environment given a map of the environment. For example, the environmental localization system 314 can identify environmental features in received optical data and determine the drone is located close to the environmental feature. The environmental localization system 314 can then search the map for the environmental feature and determine the location of the environmental feature. Knowing the location of the environmental feature, the environmental localization system 314 can determine the location of the robotic device 102.

The control system can include a navigation logic state machine 316. The navigation logic state machine 316 can include logic that uses output from the state estimator 308, the environmental map 314, and user input from the radio or ranging event recognition to generate movement commands for the robotic device 102. The different states of the navigation logic state machine 316 can be the different modes of the robotic devices 102. For example, the logic state machine 316 can include different states for modes, such as take-off mode, landing mode, position hold and hover mode, navigate to point mode, proceed to wall mode, hold at wall mode, translational wall following mode, etc. The logic state machine 316 can translate the general modes (or robotic behaviors) into control signals that the flight controller 318 can implement. The navigation logic state machine 316 can determine how to navigate between different waypoints or reference locations. The control system can include a flight controller 318 that can implement the flight instructions generated by the navigation logic state machine 316.

The control system can include a ranger controller 320. The ranger controller 320 can manage the power, operation, and reading of the sensors 300. For example, the ranger controller 320 can control when the sensors 300 are power and/or collecting data. The ranger controller 320 can set the operating mode for each of the sensors 300 based on inputs from the navigation logic state machine 316 and the mapping system 312. The ranger controller 320 can set the sampling frequency of the sensors 300. For example, the IR-ToF sensors can be set to have high frequency measurements for making distance measurements of close distances and lower frequency measurements for making distance measurements for father distances. The ranger controller 320 can also compensate for non-responsive sensors. In some implementations, sensors 300 can interfere with one another. For example, a first IR-ToF sensor can read the IR signal generated from a second IR-ToF sensor rather than the first IR-ToF sensor's reflected IR light. The ranger controller 320 can schedule the readings by the sensors 300 to reduce interference between the sensors 300.

The control system can include a ranging bias filter 322. The ranging bias filter 322 can receive ranging data and use signal processing and statistical methods to differentiate between different types of changes in ranging data. For example, also incorporating accelerometer data, the ranging bias filter 322 can determine if an object is moving toward the robotic device 102 or if the robotic device 102 is moving toward the object. The ranging event recognition module 324 can detect events. The events can include impending collisions. An indication of the event can be sent to the navigation logic state machine 316, which can adjust the drone's position and velocity.

Figure 4:
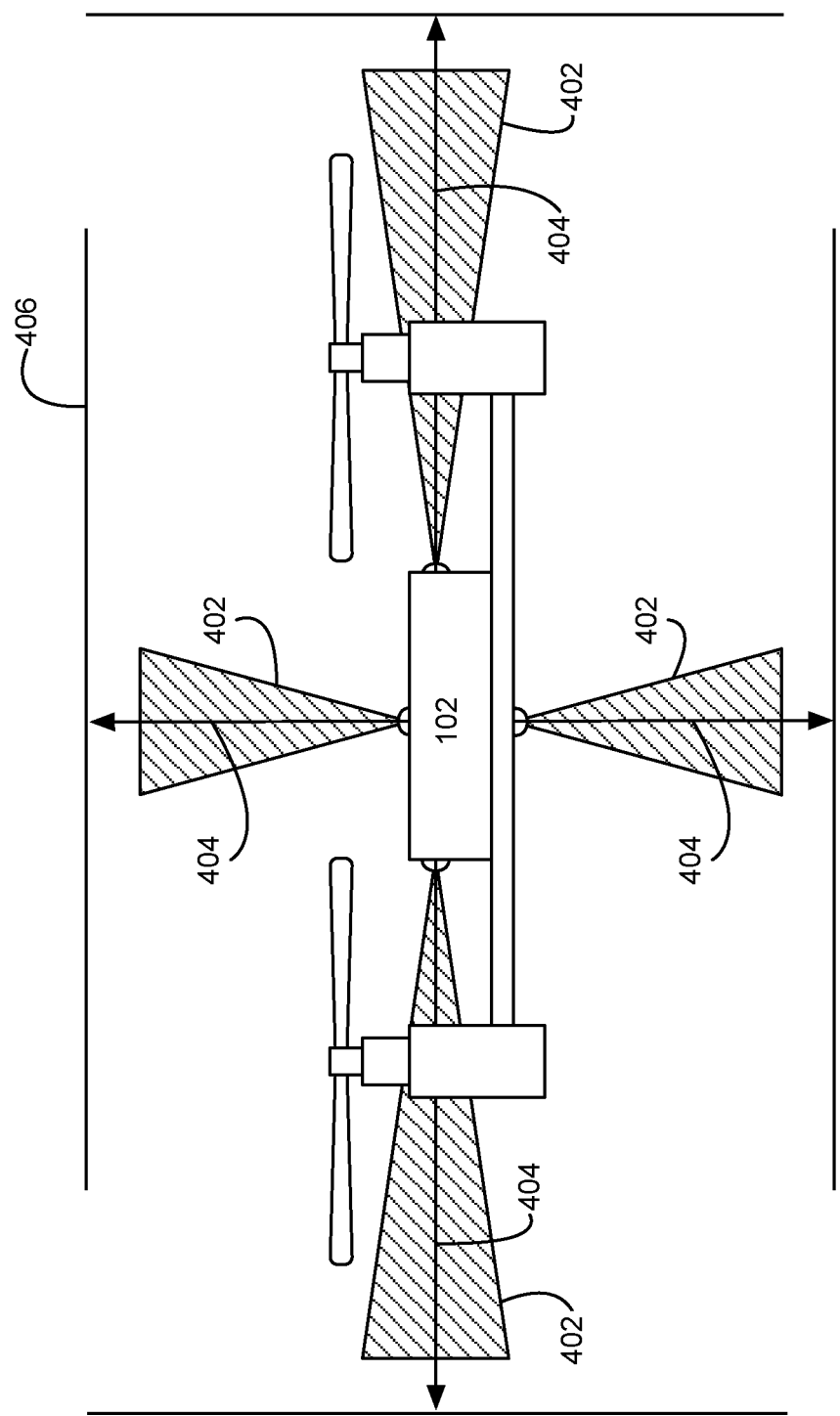
FIG. 4 illustrates an example robotic device and the device's sensing fields.

FIG. 4 illustrates an example robotic device 102 and the drone's sensing field. The robotic device 102 can include a plurality of sensors 300. Each of the sensors 300 can generate a sensing field 402. The sensors 300 can project the sensing field 402 toward a plane 406 that intersects with a primary axis 404 of the drone.

The sensors 300 may include a single sensor or multiple sensors. For example, multiple sensors 300 could project, at different angles, multiple sensing fields 402 towards a plane 406. As described above, the sensors 300 can include IR-ToF sensors. The sensors 300 can include 2D imaging sensors, such as visual cameras, thermal cameras, near-infrared cameras, and borescope cameras. The sensors 300 can include 3D imaging sensors, such as a stereo implementation of any of the above-described 2D imaging sensors, infrared time-of-flight cameras, IR positioning/motion tracking cameras, radar, and LIDAR. The sensors 300 can include environmental sensors, such as oxygen, $CO_2$, and nitrogen sensors; temperature sensors; humidity sensors; hydrocarbon sensors (e.g., methane, benzene, volatile organic compounds (VOCs), and lower explosive limit (LEL) sensors); sample collection sensors; and magnetic field sensors. The sensors 300 can include non-destructive testing systems, such as ultrasonic depth sensing/testing (UT) systems, phased array ultrasonic systems (PA), PEC systems, MFL systems, guided wave testing systems, terahertz evaluation systems, time of flight diffraction ultrasonic systems, and microwave imaging systems.

The sensors 300 can be positioned on the ±x, ±y, and ±z primary axes 404 of the robotic device 102 to provide a sensing field 402 in the ±x, ±y, and ±z direction. The plurality of sensing fields 402 may form a "spherical-sensing" field in that all directions are covered. In some implementations, additional sensors 300 may offset from the ±x, ±y, and ±z primary axes 404. In some implementations, sensors 300 may be positioned on modified (tilted or rotated) ±x, ±y, and ±z axes such that they may not be placed on the ±x, ±y, and ±z axes 404 as observed when robotic device 102 is at rest. In some implementations, it may not be optimal to place sensors 300 on the ±x, ±y, and ±z axes 404 of a robotic device 102 and it should be understood that arbitrary placement of sensor arrays is also contemplated by the invention. In such implementations, sensors 300 may be placed in different locations, and at different angles, in order to obtain a sensing field that encompasses a full spherical field of view. In some implementations, it may be desirable to have additional sensor arrays placed on certain areas of robotic device 102 in order to complete certain tasks. For example, one side of robotic device 102 may comprise a denser sensor array that could be pointed at walls in order to determine a more precise distance and orientation to a wall, or pointed down to identify details concerning a feature on the floor. In some implementations, additional sensors 300 could be added at additional orientations. With additional sensors 300, greater reliability and coverage can be achieved.

By utilizing spherical sensing via the sensors 300, robotic device 102 may be able to detect obstructions and surfaces while performing industrial inspection, which is particularly advantageous when conducting industrial inspections of internal compartments, tight spaces, or areas with many obstacles. Navigating such environments with a robotic device 102 requires that sensing be done at a high refresh rate while minimizing power draw and computational overhead.

In some implementations, data collected from sensors 300 may be applied in feedback loop in order to provide stability to the navigation of robotic device 102. Such stability may be of particular importance in implementations where robotic device 102 is an aerial robotic device. In some implementation, sensors 300 may allow for the navigation through, and mapping of, an environment without the need for GPS signals or camera-based tracking. For example, utilizing the spherical sensing capabilities of sensors 300 a robotic device 102 may be able to maintain a defined spacing from the ceiling of an industrial structure or fly to a certain location and a certain maintained speed (using sensor data as a reference in a feedback loop). Additionally, in some implementations sensors 300 may be utilized in mapping in localization. For example, by rotating the robotic device 102 with sensors 300 mounted on every face of every axis may emulate the coverage of a spinning LIDAR unit and may be utilized in generating electronic maps of an environment.

In some implementations, having sensors 300 on opposite faces of an axis may be advantageous because multiple opportunities to obtain a valid reading of sensor data may be obtained. For example, in implementations where sensor arrays are located on the faces of ±z axis, a valid sensor reading may be obtained from the sensor array in the +z direction, even when information may not be received from the sensor array in the −z direction, providing a measure of location even though a data point may be missing. Where both sensor data from both sensor arrays facing opposite directions are available, then the system may have even greater confidence in the sensor reading.

Sensors 300 may be in electronic communication with other electronic components of robotic device 102 via any standard electronic communications protocols or mechanisms. In some implementations, sensors 300 may be in communication with the control systems of robotic device 102 via and $I^2C$ bus.

In some implementations, interference between sensors 300 may be detected through an increase in the expected noise level of the sensor array signal or by a notification from the ranger controller that other sensors could cause interference with the sensors 300. In some embodiments, when interference is detected, it may be dealt with by time cycling the sensors 300 such that during a given time period only non-interfering sensors 300 are utilized.

In some implementations, sensors 300 may be mounted directly to an underlying PCB that also supports the other electronics associated with robotic device 102, thereby conserving space and resources. In some embodiments, sensors 300 may be mounted on PCBs that are separate from a central PCB supporting other electronics for robotic device 102.

In some embodiments, the PCBs supporting sensors 300 may store information about the offset and orientation of the sensors 300 in memory local to the PCB, which is then provided to the main control system for robotic device 102 during operation, thereby not requiring any specialized calibration or programming to determine position and orientation information. In alternative implementations, such as an implementation where sensors 300 may not always be on a fixed location but movable, offset and orientation information may be stored in a central PCB.

In some implementations, sensors 300 may be comprised of a plurality of range sensors, such as a plurality of IR ToF sensors, focused in the same or similar direction, creating what may be referred to as a "dense range array." In some implementations, "dense range arrays" comprised of multiple sensors may be utilized to perform specific tasks for which a "dense range array" may be better suited. For example, if an area to be inspected has a sloping floor, a single range sensor may not be able to detect that the floor is sloping, and a robotic device 102 that is attempting to maintain a fixed altitude vis-à-vis the floor may not appreciate that the floor is sloping and that the altitude of robotic device 102 may be changing as the robotic device moves across the sloping floor. A robotic device 102 with a "dense range array" comprised of two or more sensors detecting two different range distances to the floor, may be able to combine the range information gathered from the plurality of sensors in the "dense range array" with information from an IMU or accelerometer to determine that the floor is actually sloping. In such an implementation, the robotic device 102 may then correct for the sloping floor if attempting to maintain a stable altitude. In yet other implementation three range sensors, rather than two range sensors, may be utilized in the "dense range array" to assure that a sloping floor can be detected with regard to movement in any direction (implementations utilizing only two range sensors in a dense array may not detect a floor that is only sloping in one direction if the sensors were to be aligned along an axis perpendicular to the direction of the slope—a problem that may be resolved by using at least three range sensors). In some implementations, "dense range arrays" may be utilized on the side of robotic device 102, rather than the top or bottom of robotic device 102, to similarly detect whether walls or other structure are sloping or changing in a manner other than expected.

In some implementations, "dense range arrays" may also provide enhanced feature detection capabilities. For example, when a robotic device 102 is navigating a network of pipes or a pipeline it may be advantageous to identify junctions between sections of pipe or bends and turns. Without a "dense range array" comprised of a plurality of range sensors, a robotic device 102 utilizing sensors 300 with a single range sensor on the face the ±x, ±y, and ±z axes may not appreciate that it has entered a 90° bend in the pipe until it has fully entered the pipe, and could risk interpreting the bend as a dead-end cap. However, if sensors 300 comprised additional range sensors pointed at an angle 45° from the field of what were previously solitary sensors, that would enable the robotic device 102 to detect a change in pipe direction in advance of reaching the bend. While a "dense array" may be more desirable for a particular task, such tasks may also be accomplished with a more standard sensor array as well.

Figure 5:
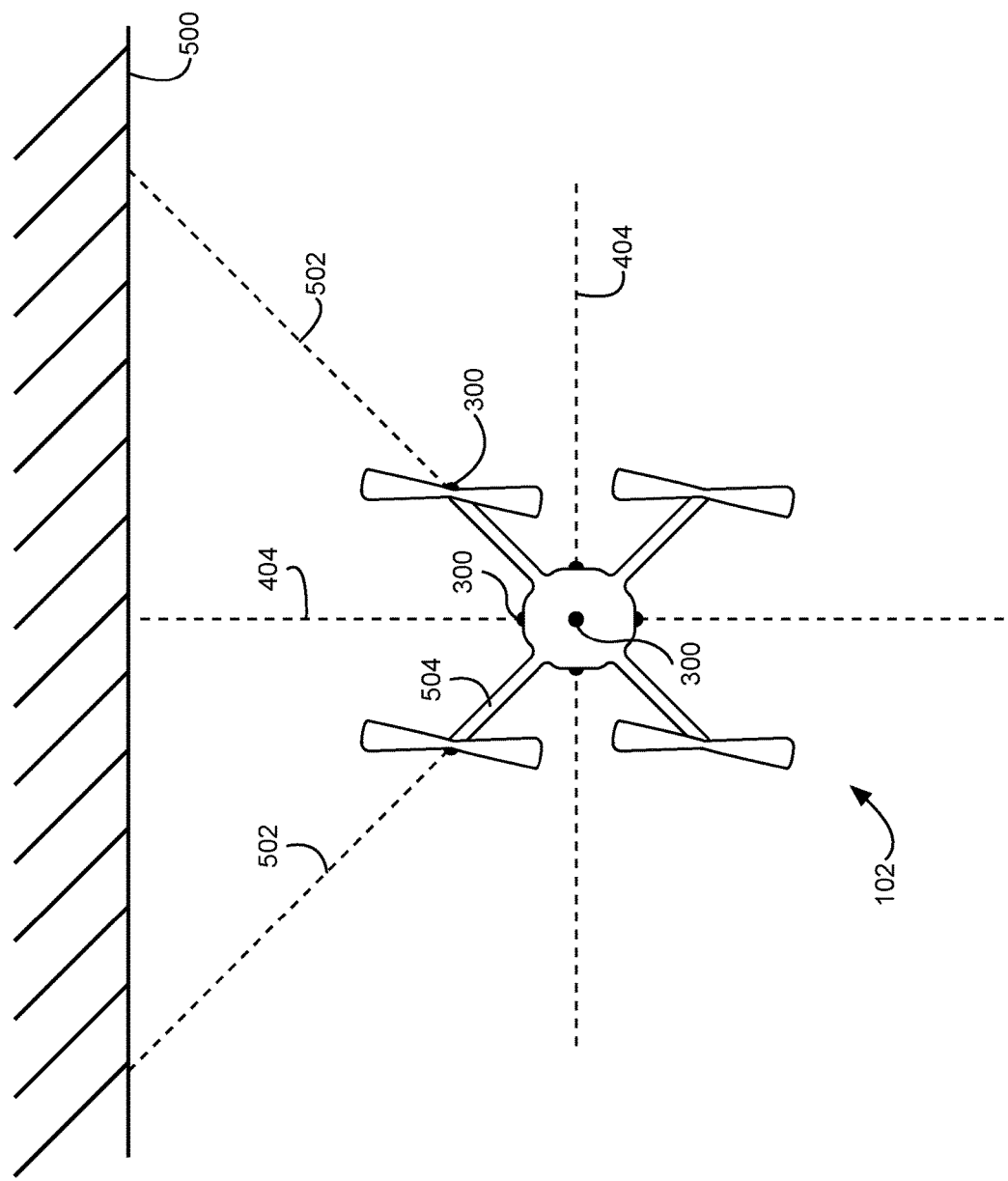
FIG. 5 illustrates an overhead view of a drone near a wall.

FIG. 5 illustrates an overhead view of a robotic device 102 near a wall 500. The robotic device 102 can include a plurality of sensors 300 positioned along one of the drone's primary axes 404. The robotic device 102 can also include sensors 300 positioned along secondary axes 502. The secondary axes 502 can align with the booms 504 of the robotic device 102. The sensors 300 can be positioned toward the end of the booms 504. The secondary axes 502 can be offset from the primary axes by 45 degrees. The above-described calibration filters can filter sensor readings from IR-ToF sensors positioned on the secondary axes 502 to correct gyroscopic drift. Gyroscopes can drift over time making it difficult to detect yaw. In some implementations, the system can correct the drift by pairing the gyroscope with a magnetometer. The surrounding (e.g., the Earth's) magnetic field can be used as a reference to correct the drift. However, inside industrial structures, magnetic fields can be inconsistent and may be unsuitable for use as a reference. In some implementations, sensors, motors, and other electronic equipment on the robotic device 102 can generate magnetic fields that can interfere with the magnetometer's ability to detect the Earth's magnetic field.

Using the IR-ToF sensor data from the three sensors 300 facing the wall 500, the robotic device 102 can determine if the robotic device 102 is positioned orthogonal to the wall 500. For example, the robotic device 102 can determine that it is substantially orthogonal to the wall 500 when the distances detected by the IR-ToF sensors positioned on the second axes 502 are substantially equal. Once orientated with respect to the wall 500, the robotic device 102 can correct the gyroscope drift. In some implementations, the robotic device 102 can reference itself against a wall of which it knows the orientation. When referencing against a known wall, the robotic device 102 can estimate its global yaw angle. The wall 500 can also be a non-flat wall. The wall 500 can have a radius that creates a curve to the wall. For example, the robotic device 102 can be oriented to the wall of a pipe or tank.

Positioning sensors 300 along the secondary axes 502 can provide the robotic device 102 with a number of other advantages. In some implementations, when visually inspecting a wall, the robotic device 102 can orient itself such that the distances detected by the IR-ToF sensors positioned on the second axes 502 are substantially equal during the inspection. Maintaining substantially the same distance between the wall 500 and the second axes 502 can enable the robotic device 102 to fly along the surface of the wall 500 and remain orthogonal to the wall 500. In some implementations, positioning the sensors 300 along with secondary axes 502 can enable the robotic device 102 to detect bends or corners in internal structures, such as piping. For example, when the distance detected along one of the secondary axes 502 increases with respect to the distances measurements along the primary axes 404, the robotic device 102 can determine that a bed or corner is present in the environment. The robotic device 102 can initiate a turn once the distance measured along the pitch axis also increases.

Figure 6:
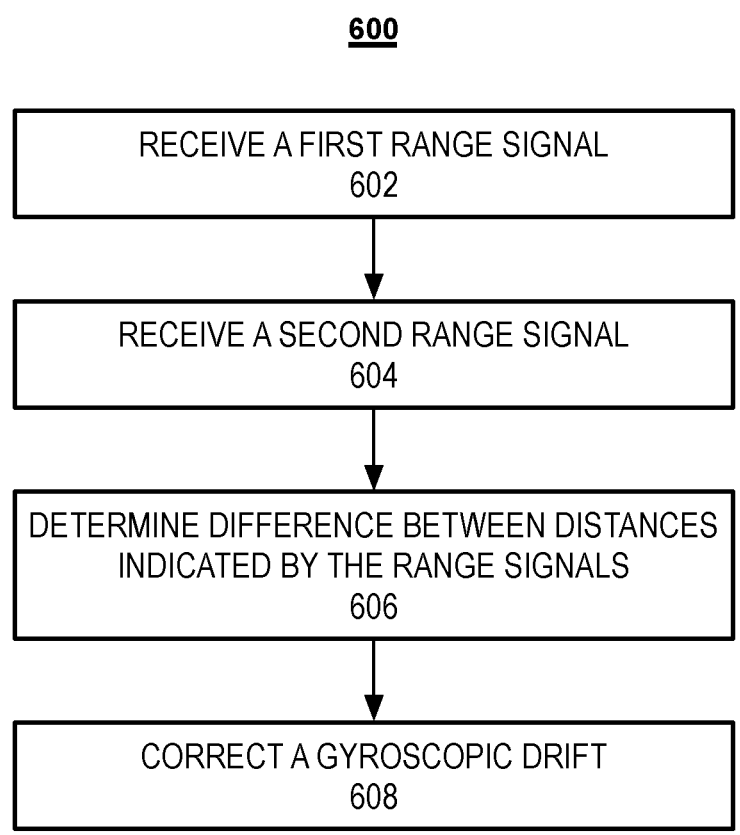
FIG. 6 illustrates a block diagram of an example method for updating gyroscopic drift.

FIG. 6 illustrates a block diagram of an example method 600 for updating gyroscopic drift. The method 600 includes receiving a first range signal (ACT 602). The method 600 includes receiving a second range signal (ACT 604). The method 600 includes determining a difference between the distances indicated by the first and the second range signal (ACT 606). The method 600 includes correcting a gyroscopic drift (ACT 608).

As set forth above, and also referring to FIG. 5, the method 600 can include receiving a first range signal (ACT 602) and receiving a second range signal (ACT 604). The first and second range signals can be received from IR ToF sensors 300 that are positioned along a secondary axis 502 of a robotic device 102. The IR ToF sensors 300 can be, for example, positioned about 45 degrees off a primary axis 404. For example, as illustrated in FIG. 5, the IR ToF sensors 300 are positioned about 45 degrees off of the primary axis 404 about which the robotic device would roll in a three-dimensional space. Each of the IR ToF sensors can generate a signal that indicates a distance to an object, such as a wall 500.

The method 600 can also include determining a difference between the distances indicated by the range signals (ACT 606). The distances can be used to calculate a true yaw angle measurement. For example, when the robotic device 102 is substantially orthogonal to the wall 500, the distances detected by the first and second IR ToF sensors 300 are substantially equivalent. When the robotic device is not orthogonal to the wall 500, the detected distances are different, and the robotic device 102 can use the differences to calculate a true yaw angle measurement. In some implementations, the robotic device can position itself in an estimated orthogonal position prior to making the distance measurements. In some implementations, if the global orientation of the wall 500 is known (e.g., indicated on a map of the industrial structure), the global true yaw angle measurement of the robotic device 102 can be made.

The method 600 can include correcting a gyroscopic drift (ACT 608). The robotic sensor can estimate its yaw angle with respect to the wall. The estimated yaw angle can be compared to the true yaw angle measurement made at ACT 606 of the method 600. If the estimated yaw angle and the true yaw angle are not substantially equivalent, the robotic device's gyroscope has drifted from true. The robotic device can subtract the drift from the future gyroscopic signals used in the navigation of the robotic device 102. In some implementations, the gyroscopic drift can be corrected every 10 seconds, 20 seconds, 30 seconds, 40 seconds, 50 seconds, 60 seconds, 5 minutes, or every 10 minutes. In some implementations, the gyroscope drift can be corrected at any time point when the robotic device 102 is within range of a wall or other object against which the robotic device 102 can measure distances detected by the IR-ToF sensors positioned on the second axes 502.

CONCLUSION

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. An inspection system comprising:
   a base station comprising at least one processor to determine a first task and a second task of an inspection operation;
   an aerial robotic device configured to autonomously navigate within an internal structure and perform the first task of the inspection operation on the internal structure; and
   a robotic device, in communication with the aerial robotic device, the robotic device configured to autonomously navigate the internal structure and perform the second task of the inspection operation on the internal structure in coordination with the aerial robotic device.

2. The system of claim 1, wherein the robotic device is a second aerial robotic device.

3. The system of claim 1, wherein the robotic device is a flightless robotic device.

4. The system of claim 1, wherein the first task of the inspection operation comprises imaging a portion of the internal structure and the second task of the inspection operation comprises lighting the portion of the internal structure.

5. The system of claim 4, wherein aerial robotic device comprises an imaging module and the robotic device comprises a lighting module.

6. The system of claim 1, wherein the robotic device is one of a communications relay robotic device, a data storage robotic device, a processing unit robotic device, a localization robotic device, and a gas sensing robotic device.

7. The system of claim 1, wherein the inspection operation includes a non-destructive inspection operation comprising at least one of ultrasonic depth sensing, phased array ultrasonic sensing, pulsed eddy current (PEC) sensing, magnetic flux leakage (MFL) sensing, guided wave testing, terahertz evaluation, time of flight diffraction ultrasonic sensing, microwave imaging, two-dimensional imaging, or three-dimensional imaging.

8. An aerial robotic device comprising:
   a first range sensor projecting at a first angle from a primary axis and towards a first plane;
   a second range sensor projecting at a second angle from the primary axis and towards the first plane; and
   a control system comprising at least one processor to:
      receive a first range signal from the first range sensor, the first range signal indicating a first distance to a wall;
      receive a second range signal from the second range sensor, the second range signal indicating a second distance to the wall;
      determine a difference between the first distance and the second distance; and
      correct a gyroscope drift based on the difference between the first distance and the second distance.

9. The device of claim 8, wherein the first angle and the second angle have a same magnitude.

10. The device of claim 8, wherein the first range sensor is a first infrared time-of-flight (IR ToF) sensor and the second range sensor is a second IR ToF sensor.

11. The device of claim 8, wherein the first range sensor is mounted on a first boom of the aerial robotic device and the second range sensor is mounted on a second boom of the aerial robotic device.

12. The device of claim 8, the control system to:
    determine an orientation of the wall; and
    correct a global yaw measurement of the aerial robotic device based on the orientation of the wall.

13. The device of claim 8, the control system to:
    maintain a flight path along the wall, wherein the first distance to the wall is substantially equivalent to the second distance to the wall.

14. An aerial robotic device comprising:
    three range sensors, wherein each of the range sensors project toward a different plane intersecting a primary axis of the aerial robotic device; and
    a control system comprising at least one processor to:
       receive a range signal from each of the three range sensors; and
       generate a flight control signal based on the range signal from each of the three range sensors, the flight control signal to control a flight path.

15. The device of claim 14, wherein the three range sensors are IR ToF sensors.

16. The device of claim 14, further comprising a seventh range sensor projecting towards one of the planes interesting the primary axis of the aerial robotic device.

17. The device of claim 14, further comprising:
    an inertial measurement unit; and
    the control system to generate the flight control signal based on a signal received from the inertial measurement unit.

18. The device of claim 14, further comprising:
    an environmental sensor; and
    a visual sensor.

19. The device of claim 18, wherein the environmental sensor is one of an oxygen sensor, a carbon dioxide sensor, a nitrogen sensor, a temperature sensor, a humidity sensor, a hydrocarbon sensor, and a magnetic field sensor and the visual sensor is one of a two-dimensional image sensor and a three-dimensional image sensor.

20. The device of claim 18, further comprising six range sensors.

* * * * *